United States Patent

Kato

[19]

[11] Patent Number: 5,974,005
[45] Date of Patent: *Oct. 26, 1999

[54] INFORMATION PROCESSING APPARATUS AND METHOD ENABLING EDITING DATA TRACKS BY USING TABLE DATA

[75] Inventor: Tetuya Kato, Tanashi, Japan

[73] Assignee: TEAC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/565,341

[22] Filed: Nov. 30, 1995

[30] Foreign Application Priority Data

Dec. 20, 1994 [JP] Japan .................................. 6-317138

[51] Int. Cl.$^6$ .............................. G11B 17/22; G11B 3/90
[52] U.S. Cl. ............................................... 369/32; 369/58
[58] Field of Search ................................ 369/47, 48, 54, 369/58, 32, 33, 83; 360/13, 14.1

[56] References Cited

U.S. PATENT DOCUMENTS 5,124,963  6/1992  Ando .................................... 369/58 X
5,303,219  4/1994  Kulakowski et al. ................ 369/58 X

FOREIGN PATENT DOCUMENTS 6-87229  11/1994  Japan .
7-192436  7/1995  Japan .

*Primary Examiner*—Paul W. Huber
*Attorney, Agent, or Firm*—Ladas & Parry

[57] ABSTRACT

A track managing unit manages data tracks stored in a predetermined data region and a freely-usable part managing unit manages freely-usable parts in the predetermined data region. A restoring unit causes the track managing unit to manage the freely-usable parts managed by the freely-usable part managing unit. Thus, parts, which once had a data deletion operation, labeled as freely-usable parts and thus managed by the freely-usable part managing unit, may then be relabeled as data tracks and thus managed by the track managing unit. As a result, data which could not be reproduced in the apparatus and method in the related art can be restored and thus reproduced. When causing the track managing unit to manage, as other tracks, a plurality of parts which have been managed by the freely-usable managing unit, the restoring unit may cause the track managing unit to manage, as another track individually, each part of the plurality of parts. Thereby, it is possible to label each part, once having a data deletion operation, as a new track and thus to effectively perform an editing operation using thus-restored data.

2 Claims, 9 Drawing Sheets

FIG. 6

| | HEADER PORTION | |
|---|---|---|
| FIRST TUNE NUMBER | 1 | |
| LAST TUNE NUMBER | 5 | |
| | BUFFER PORTION | |
| P-EMPTY | 4 (PART-DATA PORTION NUMBER) | |
| P-FRA | 0 (PART-DATA PORTION NUMBER) | |
| P-TNO 1 | 1 (PART-DATA PORTION NUMBER) | |
| P-TNO 2 | 3 (PART-DATA PORTION NUMBER) | |
| P-TNO 3 | 2 (PART-DATA PORTION NUMBER) | |
| P-TNO 4 | 5 (PART-DATA PORTION NUMBER) | |
| P-TNO 5 | 6 (PART-DATA PORTION NUMBER) | ~13j(5) |
| P-TNO 6 | | |
| ⋮ | ⋮ | |
| P-TNO 255 | | |
| | BUFFER PORTION | |
| PART-DATA PORTION 1 | START ADDRESS | |
| | END ADDRESS | 0 |
| PART-DATA PORTION 2 | START ADDRESS | |
| | END ADDRESS | 0 |
| PART-DATA PORTION 3 | START ADDRESS | |
| | END ADDRESS | 8 |
| PART-DATA PORTION 4 | START ADDRESS=0 | |
| | END ADDRESS=0 | 9 |
| PART-DATA PORTION 5 | START ADDRESS | |
| | END ADDRESS | 0 |
| PART-DATA PORTION 6 | START ADDRESS | |
| | END ADDRESS | 7 |
| PART-DATA PORTION 7 | START ADDRESS | |
| | END ADDRESS | 0 |
| PART-DATA PORTION 8 | START ADDRESS | |
| | END ADDRESS | 0 |
| ⋮ | ⋮ | |
| PART-DATA PORTION 255 | START ADDRESS | |
| | END ADDRESS | 0 |

13k(1), 13k(2), 13k(3), 13k(4), 13k(5), 13k(6), 13k(7), 13k(8), 13k(255)

13c:
- FIRST TUNE
- SECOND TUNE (I)
- FIFTH TUNE (I)
- THIRD TUNE
- FOURTH TUNE
- SECOND TUNE (II)
- FIFTH TUNE (II)

INFORMATION PROCESSING APPARATUS AND METHOD ENABLING EDITING DATA TRACKS BY USING TABLE DATA

This application claims priority from Japanese patent application No. 6-317138 filed Dec. 20, 1994. Said document is incorporated herein by reference.

BACKGROUND OF THE INVENTION

1. Field of the Invention

The present invention relates to an information processing apparatus and a method which enable editing data tracks recorded in a predetermined data area by manipulating data stored in a predetermined table. In particular, the present invention relates to a disc apparatus handling a well-known MD (Mini Disc) which is a disc information recording medium, which has recently come into wide use. Through the disc apparatus, by manipulating data stored in a rewriteable UTOC region, music recorded in a rewriteable user data region may be edited. Here, the term 'track' is used for meaning a succession of data such as music.

2. Description of Related Art

There are three kinds of MD, a pre-master disc which is used only for reproducing recorded data, a recordable disc which is used for both recording data therein and reproducing data therefrom, and a hybrid disc which has characteristics of both the pre-master disc and recordable disc. Each of the recordable disc and hybrid disc has a non-rewriteable TOC region, and a the rewriteable UTOC region, rewriteable user data region. The user data region is a collection of recording medium sections which may be used for recording data tracks (music in this case). The recording medium sections (simply referred to as 'parts', hereinafter) have digital audio data successively recoded therein.

The UTOC region has a header portion, a portion for storing the number of a first tune, a portion for storing the number of a last tune, a P-EMPTY (Pointer for the first EMPTY slot on the parts table), a P-FRA (Pointer for the start address of the FReely recordable Area), track-data portions (P-TNO(1), P-TNO(2), P-TNO(3), . . . P-TNO(n), Pointers for the start addresses of Track 1, Track 2, Track 3, . . . Track n (n is a natural number) ), and part-data portions (part descriptors). Each part-data portion is a portion for storing data which points to a respective part in the user data region. The part data stores addresses of particular tunes recorded on the disc and Link-P's (Link Pointers). For a part, a start address and an end address in the user region of the disc are stored, and further Link-P is stored if necessary. The Link-P is a pointer pointing to a possible subsequent part. If a tune consists of a plurality of successive parts, the Link-P is used for pointing to a part subsequent to a relevant part. If a relevant part has no subsequent part, that is, the relevant part is a last part in a tune, '0' is stored as the Link-P.

The P-FRA portion is used for managing part-data portions pointing to data-free parts (having no substantial data) and/or data-deleted parts (a deletion operation has been performed on data stored therein). The P-FRA portion stores pointer information pointing to a top of part-data portions pointing to such a freely-usable storage area as the data-free parts and/or data-deleted parts. Each of the track-data portions is a portion for storing pointer information pointing to a respective track stored in the user data region of the disc. Specifically, the track-data portions are used for managing parts having effective data stored therein. In each track-data portion, a number of a part-data portion indicating a top part of a respective tune is stored.

The disc apparatus for recording data in and reproducing data from the MD uses the UTOC information and thus may store in the MD a maximum of 255 tunes. By manipulating the UTOC information, any tunes recorded may be coupled to one another and any tune may be deleted. In such editing operations as tune deletion and tune coupling, it is not necessary to directly modify information (music data) stored in the user data region. The editing operations may be performed, through the manipulation of the UTOC information, by changing part allocation, changing part allocation after dividing a part, or the like. Thus, each time another tune is recorded, and each time recorded tunes are edited, part-data portions are consumed.

In a disc apparatus such as that described above in the related art, once a data deletion operation has been once performed in an editing operation and thus the UTOC region has been modified accordingly, although the relevant track or music data has not been actually removed from relevant parts of the user data area, relevant part-data portions automatically belong to the P-FRA. That is, in order to effectively use the user data region, in particular, parts in which data has a deletion operation performed thereon, the relevant parts in the user data region are labeled as being a 'freely-usable area'. Once the relevant part-data portions have belonged to the P-FRA portion, in a normal operation sequence of the disc apparatus, it is not possible to reproduce the music data stored in the relevant parts even if other data has not been overwritten therein yet. Therefore, during an editing operation, if certain parts have erroneously had a data deletion operation performed partially or completely thereon, it is not possible to restore and thus reproduce relevant music data.

Further, in a case of recording a new tune, after relevant music data has been stored in the user data region, information of the UTOC region is modified accordingly. Therefore, when the operation is unexpectedly interrupted due to some cause such as power supply disconnection during a music tune recording operation, even if music data has been recorded in the user data region, because information of the UTOC region has not been accordingly modified yet and thus relevant parts of the user data region still belong to the P-FRA, it is not possible to reproduce the recorded music data.

SUMMARY OF THE INVENTION

An object of the present invention is to provide an information processing apparatus and method in which data tracks stored in a predetermined data region may be edited by manipulating data in a predetermined table and data which could not be reproduced by the apparatus and method of the related art can be reproduced.

In information processing apparatus and method according to the present invention, track managing means is provided for managing data tracks stored in the predetermined data region and freely-usable part managing means is provided for managing freely-usable parts in the predetermined data region, and further restoring means is provided for the track managing means to manage the freely-usable parts managed by the freely-usable part managing means. Thus, parts, which once had a data deletion operation, labeled as freely-usable parts and thus managed by the freely-usable part managing means, may then be relabeled as data tracks and thus managed by the track managing means. As a result, data which could not be reproduced in the apparatus and method of the related art can be restored and thus reproduced.

Further, when causing the track managing means to manage, as other tracks, a plurality of parts which have been managed by the freely-usable managing means, the restoring means may cause the track managing means to manage, as another track individually, each part of the plurality of parts. Thereby, it is possible to label each part, once having a data deletion operation, as a new track and thus to effectively perform an editing operation using thus-restored data.

Other objects and further features of the present invention will become more apparent from the following detailed description when read in conjunction with the accompanying drawings.

BRIEF DESCRIPTION OF THE DRAWINGS

FIG. 6 illustrates an example of modification performed on the contents shown in FIG. 4 by the operation shown in FIG. 5;

DESCRIPTION OF PREFERRED EMBODIMENTS

Figure 1:
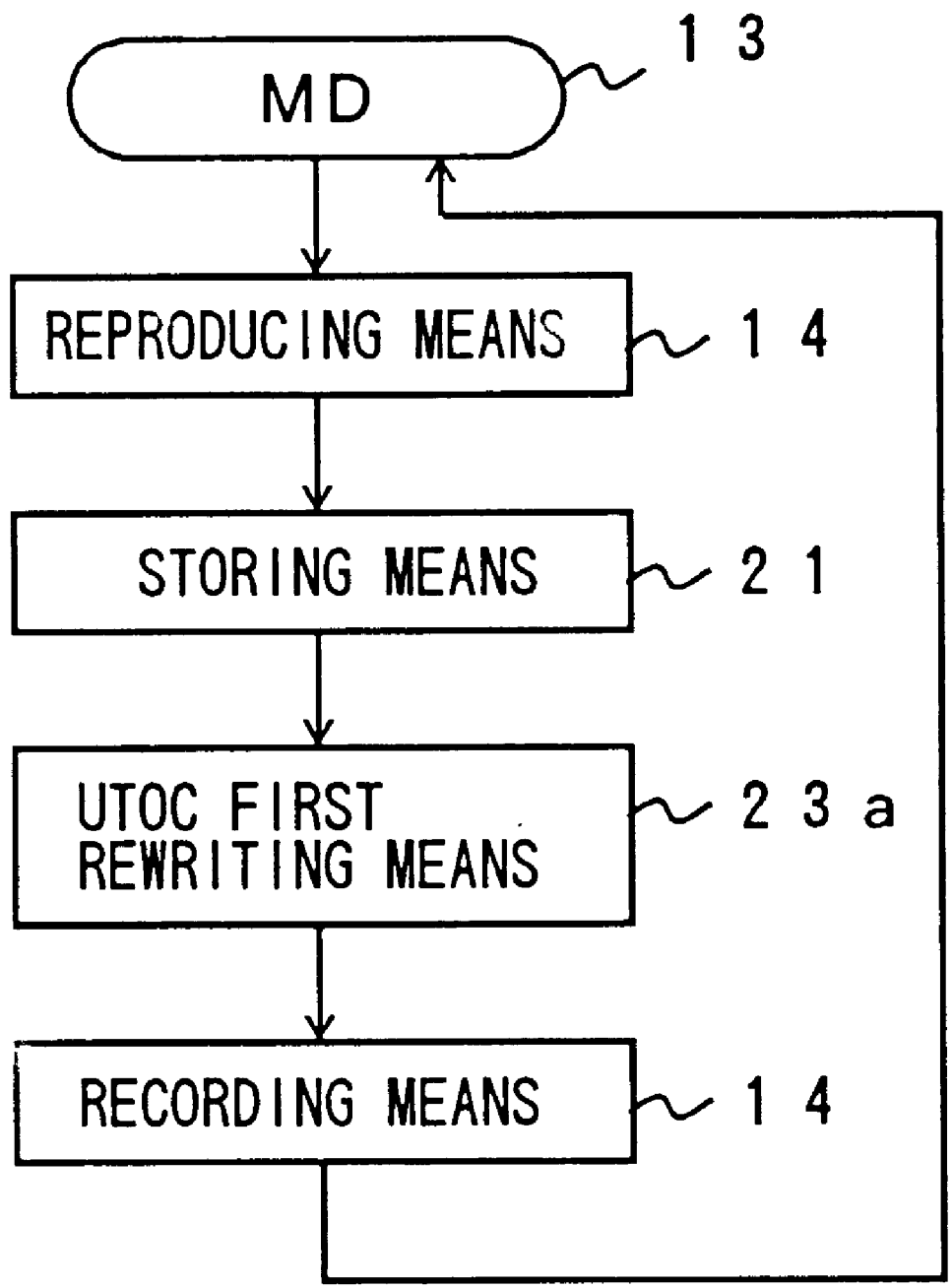
FIG. 1 shows a construct of a disc apparatus in a first embodiment of the present invention.

A disc apparatus 11 in the first embodiment of the present invention will now be described with reference to FIG. 1. The disc apparatus 11 records data on and reproduces data from the MD 13. The apparatus 11 includes reproducing means 14, storing means 21, UTOC first rewriting means 23a, and recording means 14. With reference to FIG. 2, the disc apparatus 11 will now be described in detail.

The disc apparatus 11 records compressed data on and reproduces data from the MD 13. The MD 13 is the Mini Disc which is a rewriteable music recording disc for public use and has been produced on a commercial basis. In the disc apparatus 11, a spindle motor 12 drives and thus rotates the MD 13 in a CLV (Constant Linear Velocity) manner. An optical pickup 14 acts as the reproducing (detecting) means and recording means 14 shown in FIG. 1, and emits laser beams via an objective lens 15 to the MD 13. A reproduced signal is obtained from a light reflected by the MD 13 where relevant data is read out at a detection rate of 1.4 M bits/seconds, the same as that of a CD. The thus-obtained reproduced signal is amplified by a RF (Radio Frequency) amplifier 16 and then supplied to an EFM (Eight-to-Fourteen Modulation) and ACIRC (Advanced Cross Interleave Read Solomon Code) encoder/decoder 17.

The EFM and ACIRC encoder/decoder 17 is a converting circuit for converting the reproduced signal read out from the MD 13 into compressed digital data, and performs EFM encoding/decoding, ACIRC encoding/decoding, ADIP (ADdress In Pregroove) decoding, a CLV control operation according to EFM/ADIP techniques, and so forth. Thus, the encoder/decoder 17 performs digital conversion approximately similar to that performed by a CD apparatus or the like.

The digital data thus obtained through the encoder/decoder 17 is supplied to a vibration-proof memory controller 20. The memory controller 20 is connected to a memory unit 21 including a several-M-bit DRAM, acting as the storing means 21 shown in FIG. 1. The memory controller 20 acts as a memory managing unit and temporarily stores the digital data supplied from the encoder/decoder 17 in the memory unit 21. The memory controller 20, in response to a request given by a voice-compression encoder/decoder 22, outputs the data thus stored in the memory unit 21. Further, in the memory unit 21, information stored in the above-mentioned TOC region of the MD 13, information stored in the above-mentioned UTOC region, and music information stored in the above-mentioned user data region is stored.

Each of the editing operation and operations according to the present invention, such as those which will be mentioned later with reference to FIGS. 4, 5, 6, 7, 8 and 9, is performed by modifying information of the UTOC region stored in the memory unit 21. Then, after the modification, the information of the UTOC region is copied to the MD 13. Thus, editing of tune information in the MD 13 is performed.

The memory controller 20, after thus outputting a sector of data to the voice-compression encoder/decoder 22, requests a system controller 23 to provide another sector of data. The system controller 23 includes the UTOC first rewriting means 23a shown in FIG. 1 in the first embodiment.

Both the first and second rewriting means 23a and 23b are included in the system controller 23 shown in FIG. 2. However, in the disc apparatus according to the present invention, the system controller 23 may include either one of the UTOC first and second rewriting means 23a and 23b. Further, it is also possible that, in the disc apparatus according to the present invention, the system controller 23 may include both the UTOC first and second rewriting means 23a and 23b and either one may be selectively used according to a user's request. Such selection may be performed by a relevant user key provided in the operation unit 25.

The system controller appropriately reads TOC information and UTOC information stored in the memory unit 21, and thus gives a relevant command to the encoder/decoder 17 and cause the encoder/decoder to read out a relevant subsequent sector of data. The EFM and ACIRC encoder/decoder 17 reads out the sector of data and supplies it to the memory controller 20. The system controller 23 includes a microcomputer and thus includes a CPU, a ROM, a RAM and an I/O bus not shown in the figure. A display unit 24, an operation unit 25 including a 'restoration' key and an 'all restoration' key described later, the encoder/decoder 17, memory controller 20 and so forth are connected to the I/O bus.

A reading request signal is supplied to the memory controller 20 from the voice-compression encoder/decoder 22 for each sound group of data to be supplied to voice-compression encoder/decoder 22 from the memory unit 21. The reading request is then input to the system controller 23. Further, the memory controller 20 gives a reading request signal to the system controller 23 as a result of reading information stored in the memory unit 21, which signal is sent to the EFM and ACIRC encoder/decoder 17 for each sector of data to be read out from the MD 13.

The voice-compression encoder/decoder 22 is a demodulating circuit performing a compressed-data decompressing operation. The encoder/decoder 22 decompresses 0.3-M-bit/second compressed data which is supplied by the memory controller 20. The encoder/decoder 22 then sends decompressed data to a D-A converter 27. Thus, relevant sound is output.

When data is recording in the MD 13, an A-D converter 29 converts an analog voice signal into digital data. Then, the voice-compression encoder/decoder 22 compresses the digital data which is then processed by the EFM and ACIRC encoder/decoder 17. Thus, the encoder/decoder 17 performs an operation, on the digital data, according to a modulation manner and an error-correction manner, which are approximately the same as that used for recording data in a CD. Then, a magnetic-field modulation overwrite method using both the optical pickup 14 and a recording magnetic head 19 connected to a head driving circuit 18 is used for writing relevant data in the MD 13.

The MD 13 is either the above-mentioned recordable disc or hybrid disc, and an optical disc contained in a plastic cartridge. Both data recording and reproducing is performed in the CLV manner in a spiral track extending from the center of the disc.

Figure 3:
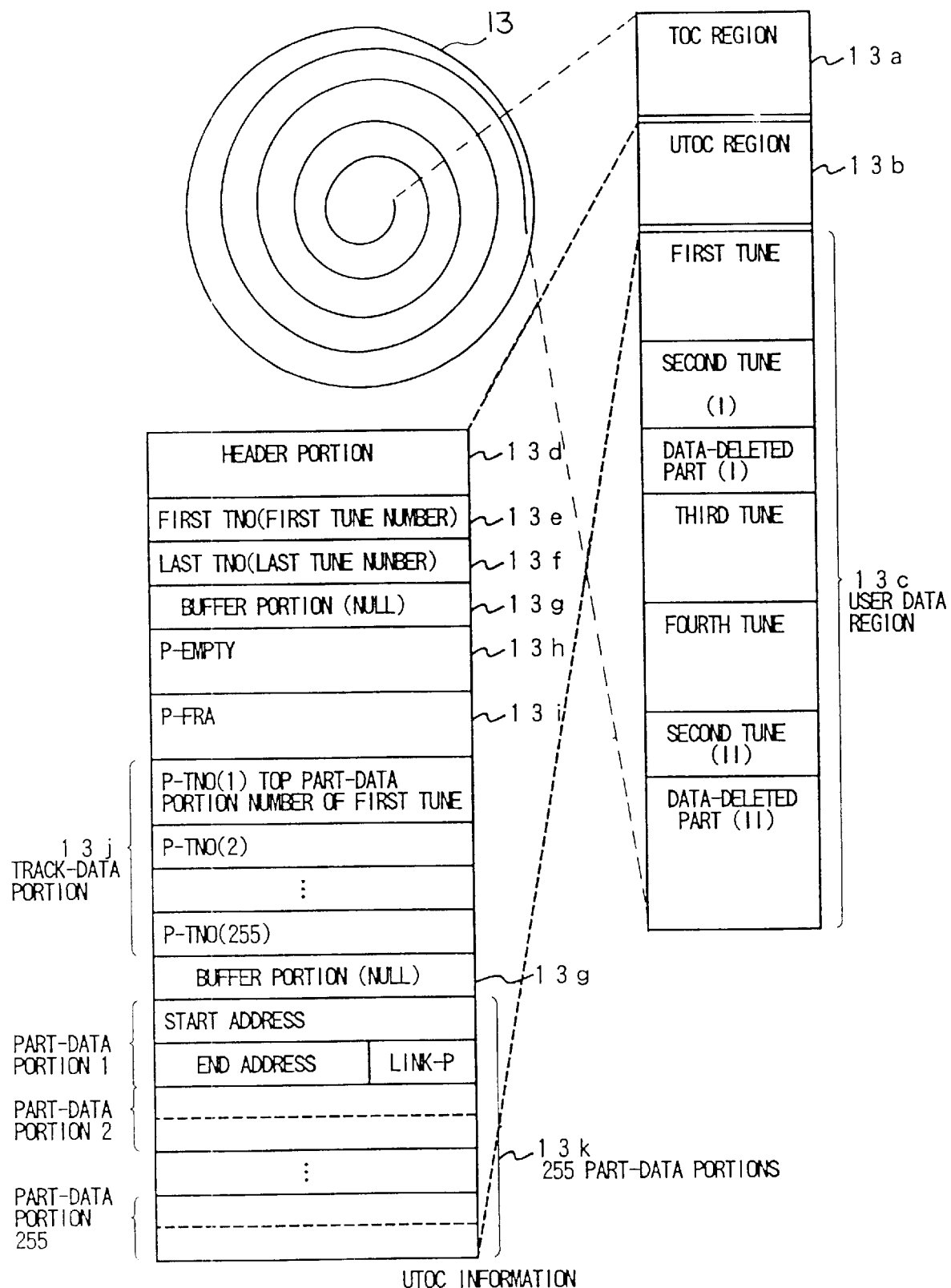
FIG. 3 illustrates a recording format of the MD.

As shown in FIG. 3, the MD 13 has the non-rewriteable TOC region 13a, rewriteable UTOC region 13b, and rewriteable user region 13c. The TOC region 13a stores information indicating storage positions of digital data in the disc. The UTOC region 13b stores the header portion 13d, portion 13e for storing the number of the first tune, portion 13f for storing the number of the last tune, buffer regions 13g, the P-EMPTY portion 13h, P-FRA portion 13i (acting as a first pointer portion), 255 track-data portions 13j (acting as second pointer portions), and 255 part-data portions 13k. The header portion 13d stores a sector sync, sector addresses, and so forth. The sector sync is a data pattern for determining a start position of a sector.

If the portion 13e for storing the number of the first tune stores '0', the disc has no tune stored therein and thus is a blank disc. If the portion 13e stores '1', at least one tune is stored in the disc. In a case where the disc is a hybrid disc, the '1' may be replaced by another different number. If the portion 13f for storing the number of the last tune stores '0', the disc has no tune stored therein and thus is a blank disc. If the portion 13e stores a number being equal to or more than '1', tunes are stored in the disc, the number of stored tunes equal to the number stored in the portion 13e. Each of the buffer portions 13g is provided for preventing failure in recording/reproducing and has a null space identified as NULL ('0').

The P-EMPTY portion 13h integrally manages not-yet-used part-data portions 13k and stores pointer information pointing to a top part-data portion of these part-data portions 13k, that is, a number of the top part-data portion. If the not-yet-used part-data portions include a plurality of part-data portions 13k, the Link-P is used for linking the plurality of part-data portions which thus belong to the P-EMPTY portion 13h. If there is a part, on which a deletion operation has been performed in an editing operation or the like, having clusters therein, the number of the clusters being less than 6, the length of the part is too short to solely have data recorded thereto and thus referred to as a non-recordable part. Accordingly, it is not necessary to record the contents of the part data (start address and end address) of the non-recordable part in the UTOC region. (Such a part as that which does not substantially belong to the UTOC region as a result of the part data thereof being deleted is referred to as a TRASH area.) By rewriting the part data of such a part as that which has become the non-recordable part to new data, it is possible to reuse the part by combining it with other parts. In order to enable such reuse, the non-recordable part is a part which is managed as the not-yet-used part by the P-EMPTY portion 13h.

The P-FRA portion 13i manages part-data portions 13k pointing to the above-mentioned data-free parts and/or data-deleted parts, which parts are treated as a freely-usable area. For this purpose, the P-FRA portion 13i stores pointer information pointing to a top of the part-data portions 13k corresponding to the freely-usable area. Specifically, the P-FRA portion stores a part-data portion number of a top part-data portion of the part-data portions indicating the data-free parts and/or data-deleted parts, each of which data-free parts and/or data-deleted parts has clusters therein, the number of clusters being equal to or more than 6. If the part-data portions indicating these data-free parts and/or data-deleted parts include a plurality of part-data portions 13k, the Link-P is used for linking the plurality of part-data portions which thus belong to the P-FRA portion 13i. A state in which '0' is stored in the P-FRA portion 13i means that there is no freely-usable area in the user data region 13c.

A track-data portion of the track-data portions 13j (P-TNO(1) through P-TNO(255)) stores pointer information pointing to and thus managing a track stored in the user data region 13c of the disc. The track-data portion 13j manages a part in which effective data is stored and stores a part-data portion number of a part-data portion 13k pointing to top of parts constituting a relevant track (tune). If the part-data portions constituting the relevant track include a plurality of part-data portions 13k, the Link-P is used for linking the plurality of part-data portions which thus belong to the track-data portion 13j.

A part-data portion 13k is used for pointing to a part (section) in the user data region 13c of the disc and may be referred to as a part descriptor. The part-data portion 13k stores therein a start address and an end address of the part, in the user data region of the disc, which a relevant track (tune) includes, and the Link-P. The Link-P is a pointer pointing to a subsequent part-data portion 13k. If the relevant tune includes another part, in addition to the relevant part, which is subsequent to the relevant part, the number of the part-data portion 13k indicating the subsequent part is stored as the Link-P of the part-data portion 13k indicating the relevant part. If there is no part which is subsequent to the relevant part, that is, if the relevant part is the last part, '0' is stored as the Link-P of the part-data portion 13k indicating the relevant part.

Each part-data portion 13k is certainly linked with one of the P-EMPTY portion 13h, P-ERA portion 13i and one of the track-data portions 13j. Therefore, a part-data portion 13k indicating a free part is certainly linked with either the P-FRA portion 13i or P-EMPTY portion 13h. If the disc is a blank disc, only a first part-data portion 13k is linked with the P-FRA portion 13i and all the other part-data portions 13k are linked with the P-EMPTY portion 13h.

An editing operation such as a tune deletion operation and/or a tune move operation may be performed not by modifying data (music data) stored in the user data region 13c but by manipulating data stored in the UTOC region 13b, specifically, by changing part allocation, changing part allocation after dividing a part, or the like. Thus, each time another tune is recorded and each time recorded tunes are edited in the MD 13, part-data portion 13k is consumed.

The user data region 13c is a collection of recording medium sections which may be used for recording data tracks. The parts have digital audio data successively recorded therein.

An example will now be described in which the user data region 13c is filled with four tunes and two data-deleted parts and a second tune includes two parts.

Figure 4:
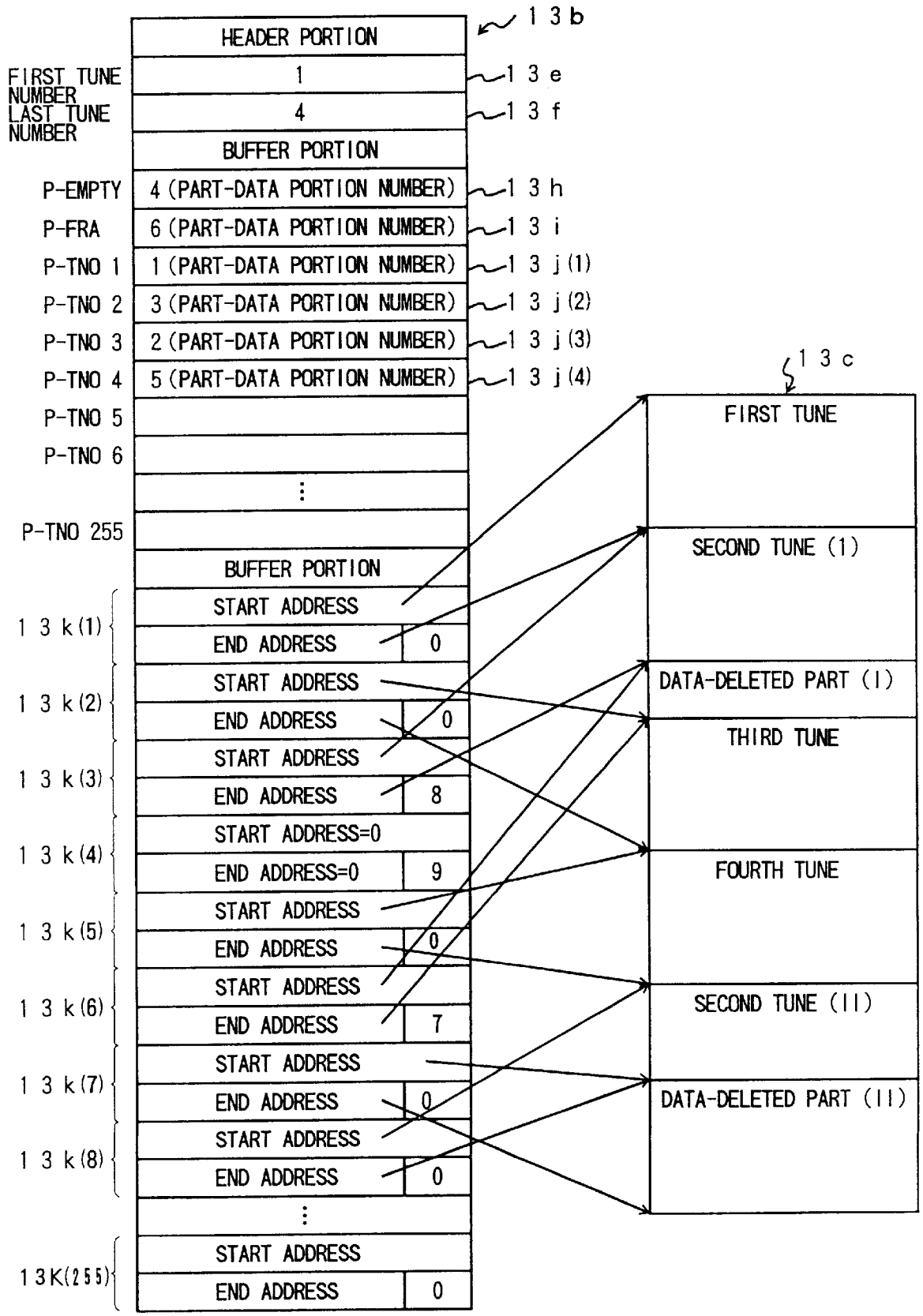
FIG. 4 illustrates an example of contents of the UTOC region of the arrangement shown in FIG. 3.

As shown in FIG. 4, in the UTOC region 13b, the portion 13e for storing the number of the first tune stores '1', the portion 13f for storing the number of the last tune stores '4', the track-data portion 13j (1) stores '1', the track-data portion 13j (2) stores '3', the track-data portion 13j (3) stores '2', and the track-data portion 13j (4) stores '5'.

'1' stored in the track-data portion 13j (1) indicates the number of the part-data portion 13k (1), '3' stored in the track-data portion 13j (2) indicates the number of the part-data portion 13k (3), '2' stored in the track-data portion 13j (3) indicates the number of the part-data portion 13k (2), and '5' stored in the track-data portion 13j (4) indicates the number of the part-data portion 13k (5).

The part-data portion 13k (1) indicates, using the start and end addresses thereof, a part of a first tune stored in the user data region 13c, the part-data portion 13k (3) indicates, using the start and end addresses thereof, a second tune part (I) stored in the user data region 13c, the part-data portion 13k (2) indicates, using the start and end addresses thereof, a part of a third tune stored in the user data region 13c, and the part-data portion 13k (5) indicates, using the start and end addresses thereof, a part of a fourth tune stored in the user data region 13c.

Further, the P-EMPTY portion 13h stores '4' as shown in FIG. 4 and thus a part-data portion 13k (4) is linked with the P-EMPTY portion 13h;

a part-data portion 13k (6) indicates, using the start and end addresses thereof, a data-deleted part (I) in the user data region 13c and is linked with the P-FRA portion 13i which thus stores '6' as shown in FIG. 4;

a part-data portion 13k (7) indicates, using the start and end addresses thereof, a data-deleted part (II) in the user data region 13c and belongs to the P-FRA portion 13i through the part-data portion 13k (6), the Link-P of which stores 7;

a part-data portion 13k (8) indicates, using the start and end addresses thereof, a second tune part (II) stored in the user data region 13c and linked with the part-data portion 13k (3), the Link-P of which stores 8.

In each of the data-deleted parts (I) and (II), music data is actually stored but has had a data deletion operation performed thereon. Link-P of each of the part-data portions 13k (1), 13k (2), 13k (5), 13k (7) and 13k (8) stores '0' indicating that a respective one of the part-data portions indicate a last part of a relevant tune. The part-data portions 13k (3) and 13k (8) indicating the second tune parts (I) and (II) are linked with each other as mentioned above through the Link-P of the part-data portion 13k (3) and the linkage indicates that the second tune part (II) is subsequent to the second tune part (I). Similarly, the part-data portions 13k (6) and 13k (7) indicating the data-deleted part (I) and data-deleted part (II) are linked with each other as mentioned above through the Link-P of the part-data portion 13k (6) and the linkage indicates that the data-deleted part (II) is subsequent to the data-deleted part (I). Link-P of the part-data portion 13k (4) which is linked with the P-EMPTY 13h as mentioned above stores '9' and this indicates that part-data portions 13k starting from the part-data portion 13k (9) together with the part-data portion 13k (4) are not-yet-used part-data portions.

Figure 2:
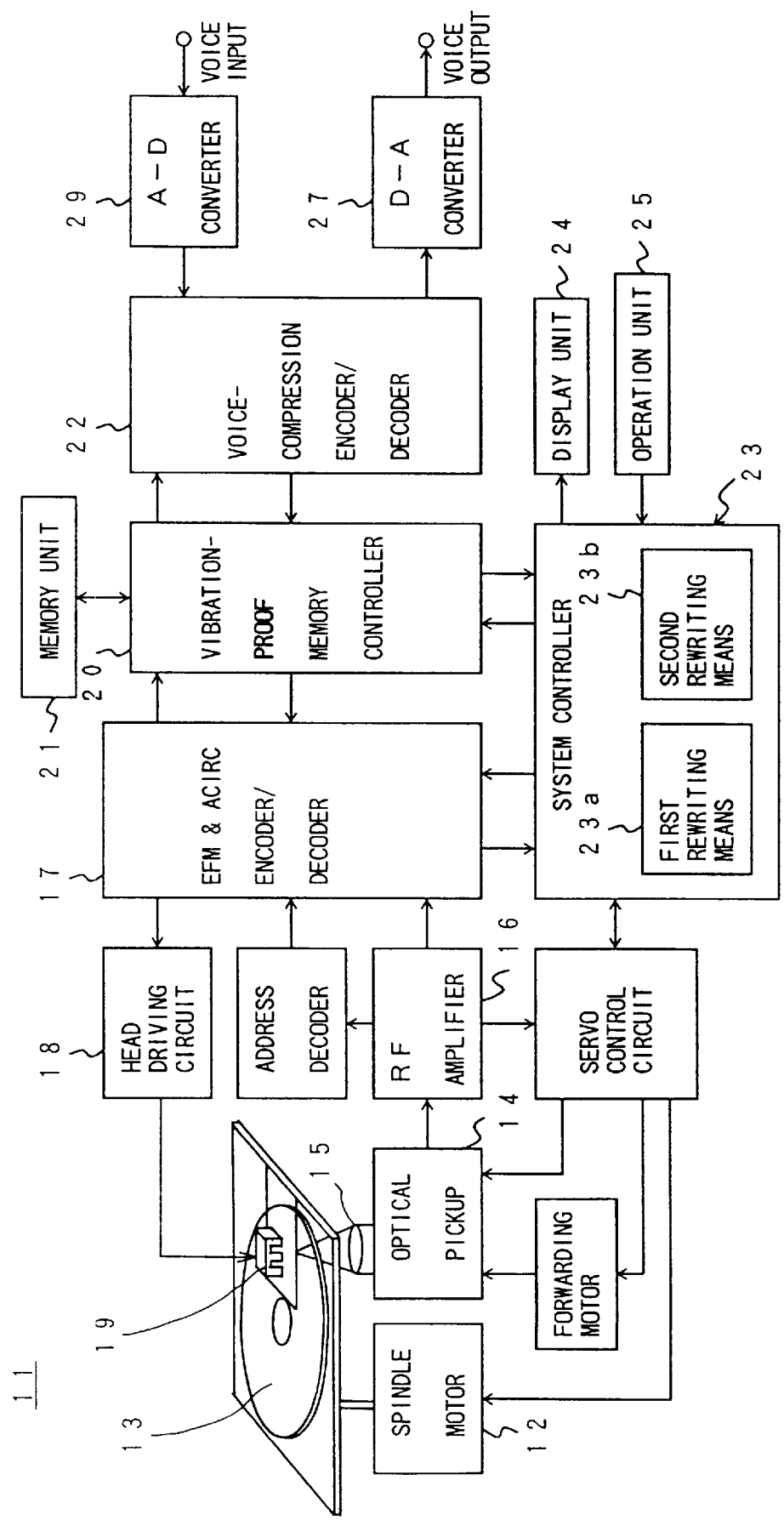
FIG. 2 shows a block diagram of the disc apparatus of each of the first and second embodiments of the present invention.

The system controller 23 of the disc apparatus 11 handling the above-described MD 13 includes the UTOC first rewriting means 23a shown in FIG. 1 as shown in FIG. 3. The UTOC first rewriting means 23a is means for enabling rewriting of the UTOC information shown in FIG. 4 into that shown in FIG. 6 through executing a program shown in FIG. 5, as will now be described.

Figure 5:
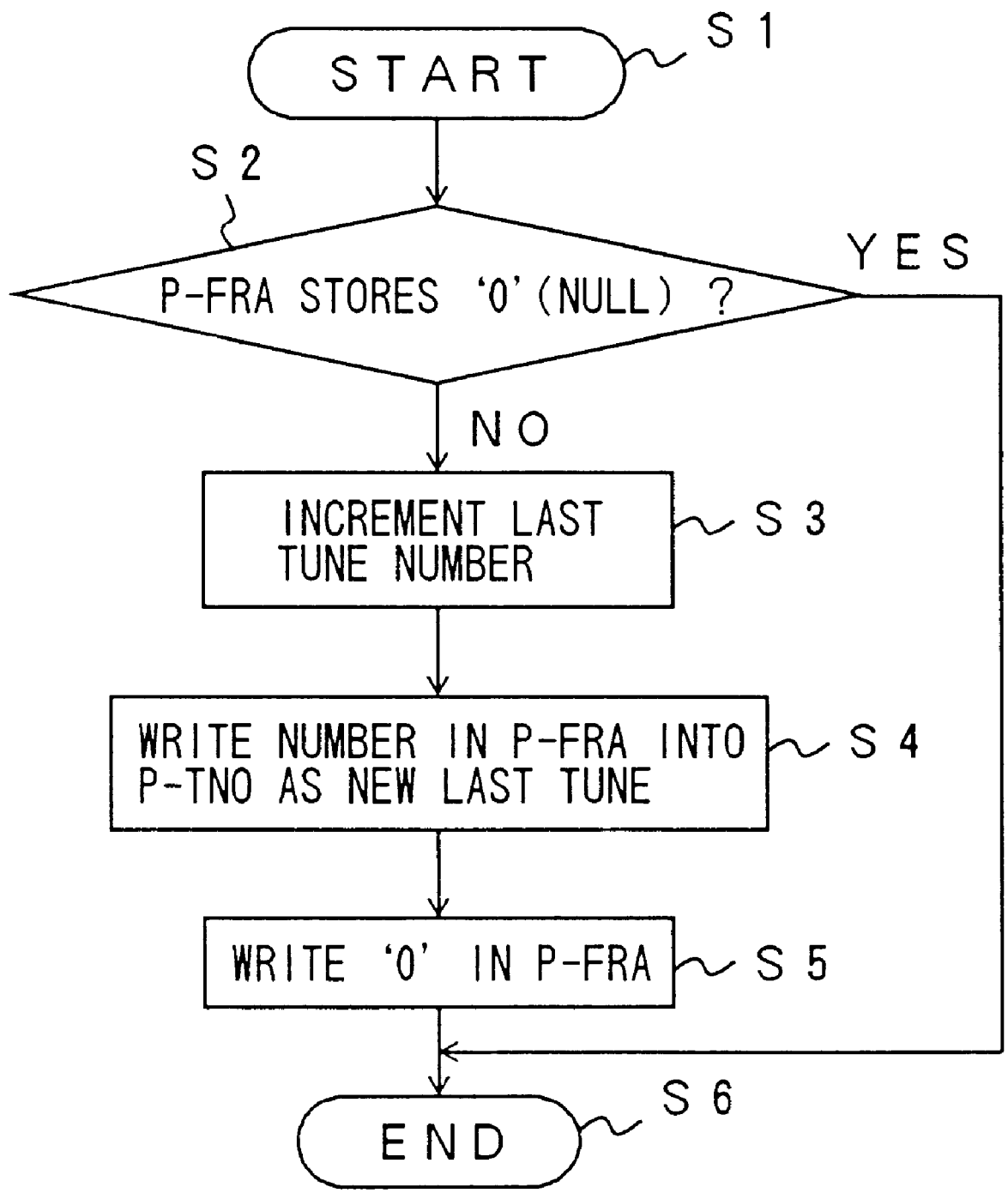
FIG. 5 shows a flowchart of an operation performed by the apparatus shown in FIG. 1.

With reference to FIG. 5, a step S1 (the term 'step' will be omitted, hereinafter) starts execution of the program in response to an operator's pressing the above-mentioned 'restoration' key of the operation unit 25 of the disc apparatus 11. S2 reads data stored in the P-FRA portion 13i in the memory unit 21 and determines whether or not the thus-read data is '0'. If the data is '0', this means that there is no part-data portion 13k belonging to the P-FRA portion 13i and then S6 is performed, thus the execution of the program being terminated. If the data is not '0' (in this case, the data is '6' as shown in FIG. 4), S3 is performed.

S3 reads data stored in the portion 13f storing the a number '4' of a last tune, adds '1' thereto and, thus, increments this number by 1. Thus the number '5' is stored, as the number of the current last tune, in the portion 13f. S4 reads the number '6' as the pointer information pointing to the part-data portion 13k (6), indicating the data-deleted part (I), from the P-FRA portion 13i. Then, the number '6' is written in the track-data portion 13j (5). Thus, the data-deleted part (I) which has been labeled as indicating the freely-usable part is labeled as indicating a part storing a tune. The tune is the 5th or fifth tune corresponding to the above-mentioned current last tune of the number '5'. Then, S5 is performed.

S5 writes '0' in the P-FRA portion 13i because the part-data portion 13k (6) which belonged to the P-FRA portion has been labeled in S4 as being a part-data portion indicating the fifth tune, and thus there is no data-part portion 13k indicating the freely-usable part in the user data region 13c. S6 terminates the execution of the program.

Thus, the UTOC information shown in FIG. 4 is modified to that shown in FIG. 6, and thus the data-deleted parts (I) and (II) which were managed by the P-FRA portion 13i, as a result of the number 6 of the part-data portion 13k (6) being stored in the P-FRA portion 13i, are managed by the track-data portion 13j (5) as the current last tune as a result of the number 6 of the part-data portion 13k (6) being stored in the track-data portion 13j (5). During the execution of the program, the Link-P of the part-data portion 13k (6) indicating the data-deleted part (I) is fixed as '7' indicating the part-data portion 13k (7) indicating the data-deleted part (II). Accordingly, the linkage of the data-deleted part (II) with the data-deleted part (I) is maintained, and thus the data-deleted part (II) is also managed by the track-data portion 13j (5) as the fifth tune automatically as a result of the data-deleted part (I) being managed by the track-data portion 13j (5) as the fifth tune. As a result, the data-deleted parts (I) and (II) in the user data region 13c shown in FIG. 4 are restored as being the fifth tune parts (I) and (II) as shown in FIG. 6 respectively without modifying the music data stored in the user data region 13c. Then, the fifth tune can be reproduced.

Thus, it is possible to restore the state similar to that which was present before the data-deletion operation was performed on the data-deleted parts (I) and (II). Further, by performing an editing operation for moving the position of the thus-produced fifth tune in a sequence of tunes, it is possible to restore the original state which was present before the data-deletion operation was performed on the data-deleted parts (I) and (II). If only the fifth tune part (II) is needed between the thus newly produced fifth tune parts (I) and (II), an editing operation may be performed and thus a data deletion operation is again performed on the fifth tune part (I). Further, S3 shown in FIG. 5 may be performed after S4 or after S5 instead of after S2. Further, when the data-deleted parts have been restored, a temporary title such as 'UNDELETED AREA' indicating the restoration performed may be automatically given in a UTOC title region (not shown in the figures) for the restored parts in the UTOC region 13b.

Although not shown in the figure, the UTOC title region is provided in the MD 13 together with the UTOC region 13b and has a structure similar to that of the UTOC region 13b. The UTOC title region includes a data storage area for storing disc names or track names, instead of the part-data portions 13k of the UTOC region 13b, which may store a title for each part present in the user data region.

Further, an example will now be described in which an operation is unexpectedly interrupted due to some cause such as power supply disconnection during a music tune recording operation. In such a case, music data has been actually recorded in the user data region 13c. However, information of the UTOC region has not been accordingly modified yet because the tune recording operation has been interrupted. Accordingly, a relevant part of the user data region 13c still belong to the P-FRA portion 13i and is thus treated as the freely-usable area. This freely-usable area in the user data region 13c thus includes the parts which store the music data through the interrupted recording operation but has been managed by the P-FRA portion 13i as a result of the number of the relevant part-data portion 13k being stored in the P-FRA portion 13i. As a result, it is not possible to reproduce the recorded music data in this state.

Then, the state may be modified by performing an UTOC information rewriting operation such as that described with reference to FIGS. 4, 5 and 6. As a result the freely-usable area in the user data area is thus managed by a track-data portion 13j as a current last tune as a result of the number of the relevant part-data portion 13k being stored in the track-data portion 13j. As result, it is possible to reproduce the music data stored through the interrupted recording operation.

Figure 7:
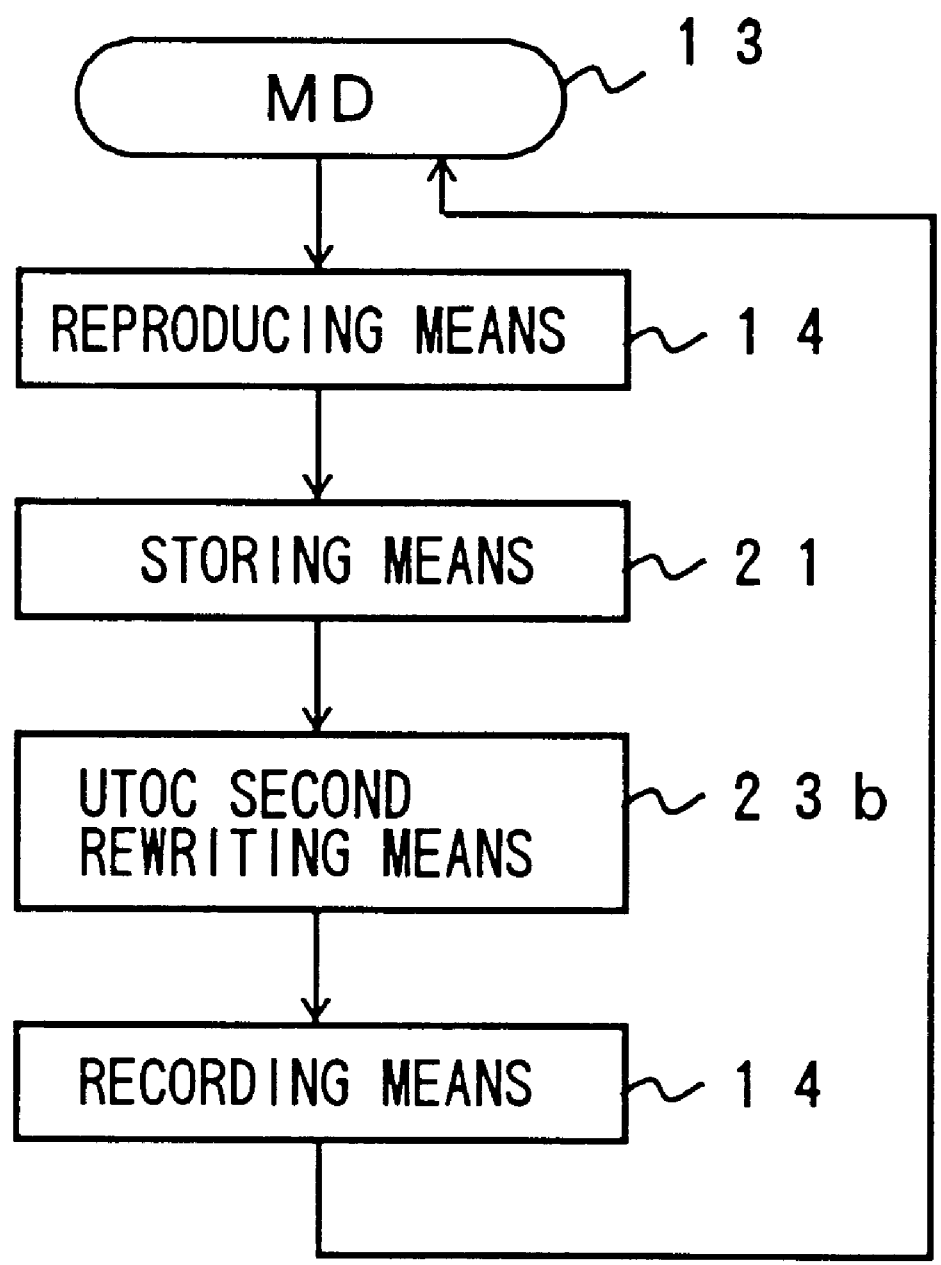
FIG. 7 shows a construct of a disc apparatus in a second embodiment of the present invention.

The disc apparatus 11 in a second embodiment of the present invention will now be described with reference to FIGS. 7, 8 and 9. With reference to FIG. 7, the disc apparatus 11 in the second embodiment uses the above-mentioned UTOC second rewriting means 23b included in the system controller 23. Except for this matter, the disc apparatus 11 in the second embodiment has the same construction as that of the disc apparatus 11 in the first embodiment. The UTOC second rewriting means 23b enables modification of the UTOC information shown in FIG. 4 into that shown in FIG. 9 through executing a program shown in FIG. 8 as will now be described with reference to FIGS. 4, 8 and 9.

Figure 8:
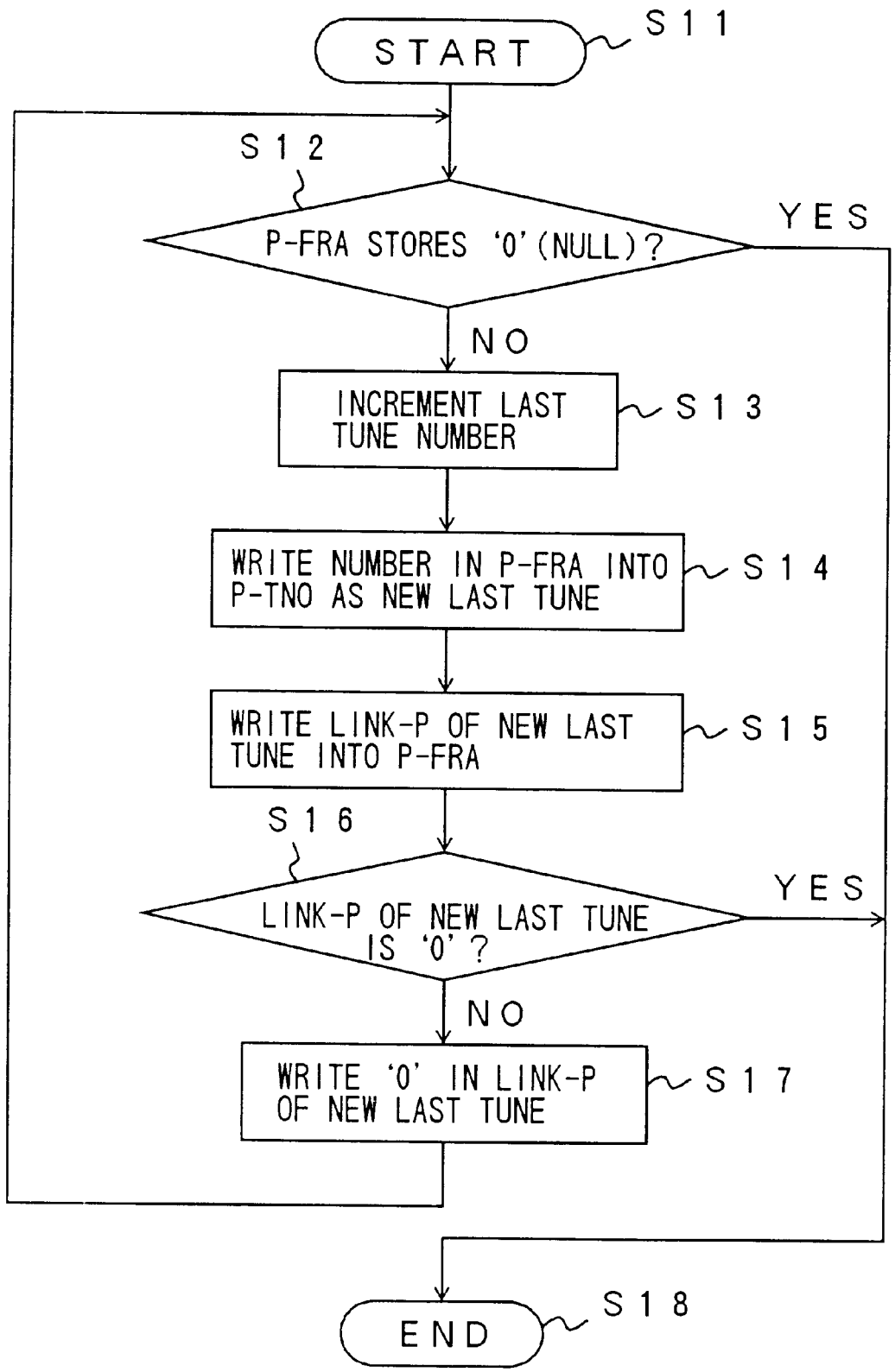
FIG. 8 shows a flowchart of an operation performed by the apparatus shown in FIG. 7.

With reference to FIG. 8, a step S11 starts execution of the program in response to an operator's pressing the above-mentioned 'all restoration' key of the operation unit 25 of the disc apparatus 11. S12 reads data stored in the P-FRA portion 13i in the memory unit 21 and determines whether or not the thus-read data is '0'. If the data is '0', this means that there is no part-data portion 13k belonging to the P-FRA portion 13i and then S18 is performed, thus the execution of the program is terminated. If the data is not '0' (in this case, the data is '6' as shown in FIG. 4), S13 is performed.

S13 reads data stored in the portion 13f storing the number '4' of the last tune, adds '1' and thus increments this number by 1. Thus, the number '5' is stored, as the number of the current last tune, in the portion 13f. S14 reads the number '6' as the pointer information pointing to the part-data portion 13k (6), indicating the data-deleted part (I), from the P-FRA portion 13i. Then, the number '6' is written in the track-data portion 13j (5). Thus, the data-deleted part (I) which has been labeled as indicating the freely-usable part is labeled as indicating the first part of parts storing a tune. The tune is the 5th or fifth tune corresponding to the above-mentioned current last tune of the number '5'. Then, S15 is performed.

S15 reads data from the Link-P of the part-data portion 13k (6) which indicates the data-deleted part (I) thus labeled as the first part of the current last tune of the number 5 as in S14. The thus-read data of the Link-P is '7' as shown in FIG. 4 pointing to the part-data portion 13k (7). This number '7' is then written in the P-FRA portion 13i. S16 again reads data of the Link-P of the part-data portion 13k (6) and determines whether or not the thus-read number is 0. If it is 0, S18 is performed and the execution of the program is terminated. In this case, the read data is 7 and therefore S17 is performed. S17 rewrites the thus-read data 7 of the Link-P of the part-data portion (6) into 0 and S12 is again performed. By rewriting the link-P of the part-data portion (6) into 0, only a single part, which was the first part of the parts storing the fifth tune, is allocated as the fifth tune.

Then, S12, S13, S14, S15 and S16 are performed again. S12 reads data 7 which is written in the P-FRA portion 13i in the memory unit 21 in S15 as mentioned above. S13 reads data stored in the portion 13f which stores the number 5 of a last tune as a result of the increment operation previously performed in S13. Then, this number 5 is further incremented by 1. Thus the number 6 is stored, as the number of the current last tune, in the portion 13f. S14 reads the number 7 as the pointer information pointing to the part-data portion 13k (7), indicating the data-deleted part (II), from the P-FRA portion 13i. Then, the number 7 is written in a subsequent track-data portion 13j (6) as shown in FIG. 9. Thus, the data-deleted part (II) which has been labeled as indicating the freely-usable part is labeled as indicating a part storing a tune. The tune is the 6th or sixth tune corresponding to the above-mentioned current last tune of the number '6'. Then, S15 is performed.

S15 reads data from the Link-P of the part-data portion 13k (7). The thus-read data of the Link-P is '0' as shown in FIG. 4 indicating that there is no part-data portion which is linked with the part-data portion 13k (7). This number 0 is then written in the P-FRA portion 13i. S16 again reads the Link-P of the part-data portion 13k (7) and determines whether or not the thus-read number is 0. In this case, the data is 0, and thus S18 is performed and the execution of the program is terminated.

Figure 9:
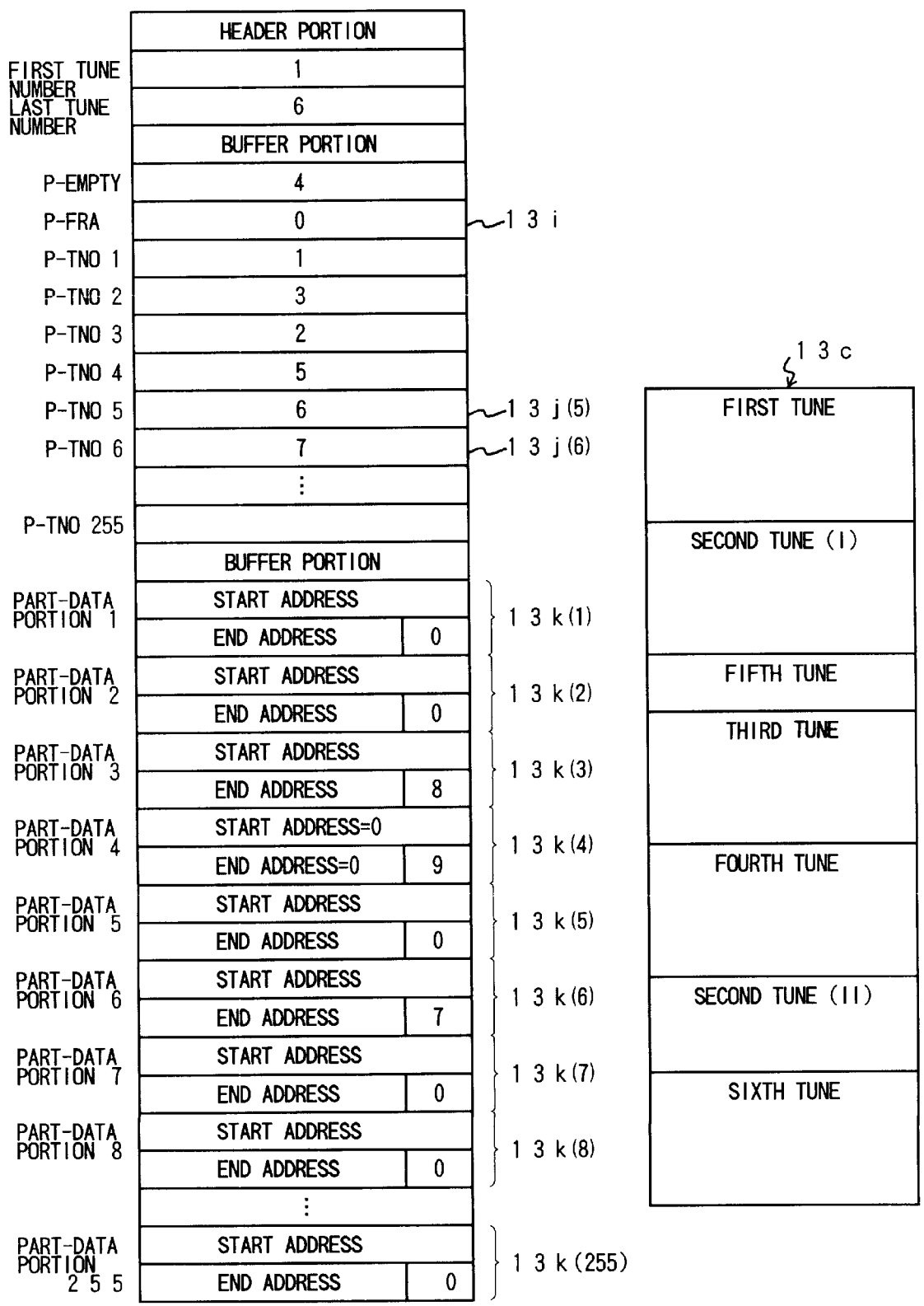
FIG. 9 illustrates an example of modification performed on the contents shown in FIG. 4 by the operation shown in FIG. 8.

Thus, the UTOC information shown in FIG. 4 is modified to that shown in FIG. 9. The data-deleted parts (I) and (II) were managed by the P-FRA portion 13i because the number 6 of the part-data portion 13k (6) indicating the data-deleted part (I) was stored in the P-FRA portion 13i and the part-data portion 13k (7) indicating the data-deleted part (II) is linked with the part-data portion 13k (6) through the Link-P of the part-data portion 13k (6). These data-deleted parts (I) and (II) are thus managed by the track-data portions 13j (5) and 13j (6) as the current last tunes because the numbers 6 and 7 of the part-data portions 13k (6) and 13k (7) indicating the data-deleted parts (I) and (II) are stored in the track-data portions 13j (5) and 13j (6) respectively. As a result, the data-deleted parts (I) and (II) in the user data region 13c shown in FIG. 4 are restored as being the fifth and sixth tunes as shown in FIG. 9 respectively without modifying the music data stored in the user data region 13c. Then, the fifth and sixth tunes can be reproduced.

Thus, it is possible to restore a state similar to that which was present before the data-deletion operation was performed on the data-deleted parts (I) and (II). Further, by performing an editing operation for moving the position of the thus-produced fifth and sixth tunes in a sequence of tunes, it is possible to restore the original state which was present before the data-deletion operation was performed on the data-deleted parts (I) and (II). If only the fifth tune is needed between the thus newly produced fifth and sixth tunes, an editing operation may be performed and thus a data deletion operation is again performed on the fifth tune.

Further, when the data-deleted parts have been restored, temporary titles such as 'UNDELETED AREA (1)' and 'UNDELETED AREA (2)' indicating the restoration performed with numbering (1) and (2) may be automatically given for the restored parts in the above-described UTOC title region relevant to the UTOC region 13b. The numbering such as (1) and (2) of the temporary titles is convenient for a user to efficiently perform an editing operation using the thus-restored parts.

The operation of the disc apparatus 11 in each of the first and second embodiment according to a respective one of the programs shown in FIGS. 5 and 8 is performed as a result of the above-mentioned CPU of the system controller 23 executing a respective program stored in the ROM using the RAM as temporarily data storing means.

Further, the present invention is not limited to the above described embodiments, and variations and modifications may be made without departing from the scope of the present invention.

What is claimed is:

1. A disc apparatus for performing data recording/reproducing on a disc, the disc comprising:

a rewriteable UTOC region and a rewriteable user data region, the user data region having at least a collection of parts, in each of which parts data is continuously recorded, the UTOC region having part descriptors, a first pointer region, a second pointer region and a region which indicates the number of the last track on the disc, each of said part descriptors being provided for pointing to a respective one of the parts on the disc, and having a start address indicating the start in the user data region on the disc, an end address indicating the end in the user data region on the disc, and a link pointer which is a pointer pointing to the subsequent part descriptor, the first pointer region being provided for unitarily managing at least one of data-free parts and data-deleted parts in the user data region, storing therein pointer information pointing to a top of the part descriptors which point to the at least one of the data-free parts and the data-deleted parts, and, when the part descriptors which point to the at least one of the data-free parts and the data-deleted parts comprise a plurality of part descriptors, said plurality of part descriptors being linked by the link pointers so that said plurality of part descriptors are managed in the first pointer region, the second pointer region being provided for managing tracks, and for managing parts, in each of which parts effective data is stored, the region which indicates the number of the last track being provided for storing therein the number of the last track on the disc, said disc apparatus comprising:

means for writing, in the second pointer region at a portion, the pointer information pointing to a part descriptor managed in the first pointer region, said portion being the portion corresponding to the number subsequent to the number of the last track; and means for rewriting the number of the last track to the subsequent number.

2. A disc apparatus for performing data recording/reproducing on a disc, the disc comprising:

a rewriteable UTOC region and a rewriteable user data region, the user data region having at least a collection of parts, in each of which parts data is continuously recorded, the UTOC region having part descriptors, a first pointer region, a second pointer region and a region which indicates the number of the last track on the disc, each of the part descriptors being provided for pointing to a respective one of the parts on the disc, and having a start address indicating the start in the user data region on the disc, an end address indicating the end in the user data region on the disc, and a link pointer which is a pointer pointing to the subsequent part descriptor, the first pointer region being provided for unitarily managing at least one of data-free parts and data-deleted parts in the user data region, storing therein pointer information pointing to a top of the part descriptors which point to the at least one of the data-free parts and the data-deleted parts, and, when the part descriptors which point to the at least one of the data-free parts and the data-deleted parts comprise a plurality of part descriptors, said plurality of part descriptors being linked by the link pointers so that said plurality of part descriptors are managed in the first pointer region, the second pointer region being provided for managing tracks, and for managing parts, in each of which parts effective data is stored, the region which indicates the number of the last track being provided for storing therein the number of the last track on the disc, said disc apparatus comprising:

first means for writing, in the second pointer region at portions, the pointer information pointing to part descriptors managed in the first pointer region, sequentially, said portions being the portions corresponding to the numbers subsequent to the number of the last track; and second means for rewriting the number of the last track to the subsequent number repeatedly a number of times, said number corresponding to the number of said part descriptors subsequently written in the second pointer region by said first means.

* * * * *